United States Patent [19]

Cook

[11] Patent Number: 4,941,782

[45] Date of Patent: Jul. 17, 1990

[54] ADJUSTABLE BORING BAR

[75] Inventor: Kenneth J. Cook, Troy, Mich.

[73] Assignee: GTE Valenite Corporation, Troy, Mich.

[21] Appl. No.: 292,069

[22] Filed: Dec. 30, 1988

[51] Int. Cl.$^5$ ............................................. B23B 51/00
[52] U.S. Cl. ........................................ 408/147; 82/1.4
[58] Field of Search ........................ 408/146, 147, 186; 82/1.4, 1.5

[56]  References Cited

U.S. PATENT DOCUMENTS

| 3,740,161 | 6/1973 | Milewski | 408/158 |
| 4,224,846 | 9/1980 | Eysel et al. | 82/36 |
| 4,664,236 | 5/1987 | Stangroom | 192/35 |
| 4,687,589 | 8/1987 | Block et al. | 252/73 |
| 4,720,087 | 1/1988 | Duclos et al. | 267/140 |
| 4,733,758 | 3/1988 | Duclos et al. | 188/267 |

FOREIGN PATENT DOCUMENTS 39806  4/1981  Japan .................................. 408/147

OTHER PUBLICATIONS

"Fluids That Thicken Electrically" by T. G. Duclos, D. N. Acker & J. D. Carlson, Machine Design/Jan. 21, 1988, pp. 41–46.

Primary Examiner—Daniel W. Howell
Attorney, Agent, or Firm—Robert E. Walter

[57] ABSTRACT

A boring type tool includes mean for biasing a cutting bit in a first radial direction with respect to an axis of rotation and means for adjustably moving the cutting bit to a predetermined desired position against the force of the biasing means. The adjustable moving means includes a fluid pressure source for an incompressible electrorheological fluid and a means communicating with the fluid pressure source and the cutting bit for the flow of electrorheological fluid for adjustably moving the cutting bit in a direction opposing the first radial direction in proportion to pressure being generated by the fluid pressure source. A valve means is operably associated with the communicating means for effecting changes in the dynamic stiffness of the electrorheological fluid in response to an electric field. An electric field producing means is provided for transmitting a sufficient electric field to the valve means to substantially block the flow of electrorheological fluid to the cutting bit from the fluid pressure source and maintain a predetermined radial position of the cutting tool.

7 Claims, 1 Drawing Sheet

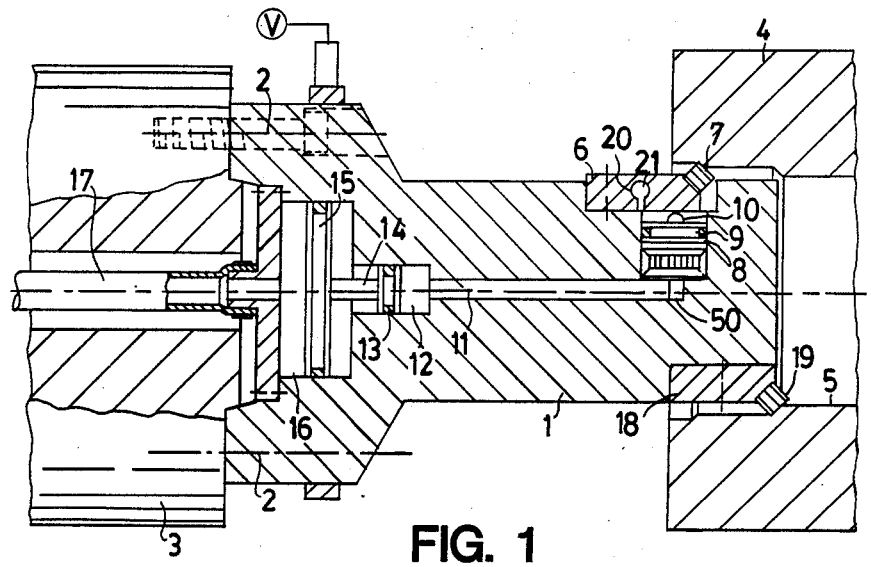
FIG. 1
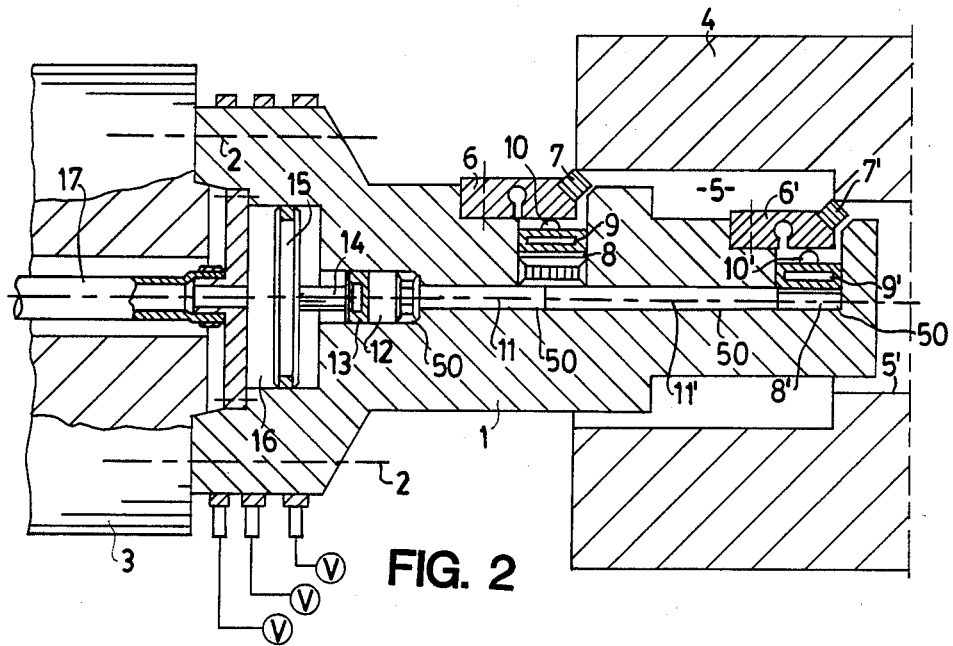
FIG. 2
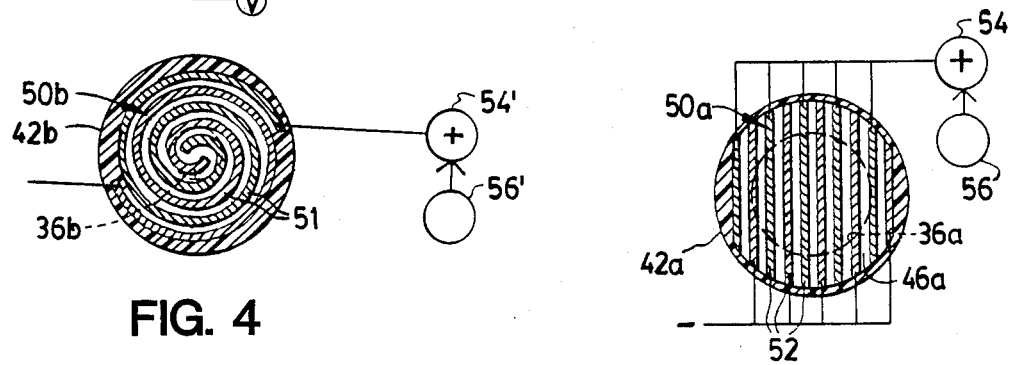
FIG. 4
FIG. 3

ADJUSTABLE BORING BAR

Field of the Invention

The present invention relates to the field of machining tools such as boring bars and more particularly to boring bars with one or more cutting bits positioned radially from the axis of rotation for boring the work to be cut.

Background of the Invention

In a typical boring bar, cutting inserts of the indexable type are mounted along the outer periphery of the boring bar and are radially adjustable. By moving the insert outwardly the depth of cut can be increased. Retraction of the insert permits withdrawal of the insert without marring the finished bore.

Modern day boring bar operations place increasing emphasis on speed and accuracy. Each application must be evaluated in terms of a wide range of variables and the increasing demand for precision parts. This is particularly true with respect to high speed applications. In developing boring bar equipment it is desirable t provide rapid and precise adjustment of indexable inserts without sacrificing accuracy or unnecessarily loading the bar.

U.S. Pat. No. 3,740,161 to Milewski relates to a machine tool which provides automatic adjustment for cutting radially inward or outward, as and when desired, to compensate for insert wear, for undercutting, chamfering, finishing on a retract stroke, or to withdraw the tool from a workpiece without marking the side wall of a finished bore. The adjustable cutting tool includes a spindle rod to retract the cutting edge following a work stroke, an abutment stop that the spindle rod bears against during a work stroke, and means for setting the spindle stop free from the axial load normally imposed thereupon.

Another prior art boring bar with radially adjustable cutting heads is disclosed in U.S. Pat. No. 4,224,846 to Eysel et al. The radial adjustment of the cutting head is provided by using a liquid which displaces the cutting head according to the desired size of the bore being machined. Although the liquids used in tools of this type are substantially incompressible, the above system utilizes a pneumatic system coupled with the hydraulic system so that a compressible fluid is introduced into the system which may undesirably effect a desired cutting head position and the accuracy of a cut.

Heretofore, fluid actuated prior art systems for adjusting the radial position of a cutting bit include features which may undesirably affect maintaining the cutting bit in the proper predetermined position during a machining operation.

SUMMARY OF THE INVENTION

It is an object of the present invention to provide for an enhanced cutting tool wherein the radial position of a cutting bit is accurately maintained in the proper predetermined position during a machining operation.

It is an object to of the present invention to provide a boring tool having a fluid actuated system for a boring tool wherein the propensity of the fluid to flow may be reduced to maintain a predetermined tool setting.

In accordance with the present invention there is provided, a cutting tool of the type having an axis of rotation and a peripheral surface area spaced from the axis of rotation with at least one radially displaceable cutting bit mounted thereto. The cutting tool is the type typically used for machining operations such a boring. The cutting tool includes mean for biasing said cutting bit in a first radial direction with respect to said axis of rotation and means for adjustably moving said cutting bit to a predetermined desired position against the force of the biasing means. The adjustable moving means includes a fluid pressure source for an incompressible electrorheological fluid and a means communicating with said fluid pressure source and said cutting bit for the flow of electrorheological fluid to adjustably move the cutting bit in a direction opposing said first radial direction in proportion to pressure being generated by the fluid pressure source. A valve means is operably associated with the communicating means for effecting changes in the dynamic stiffness of the electrorheological fluid in response to an electric field. An electric field producing means is provided for transmitting a sufficient electric field to the valve means to substantially block the flow of electrorheological fluid to said cutting bit from the fluid pressure source and maintain a predetermined radial position of said cutting tool.

BRIEF DESCRIPTION OF THE DRAWINGS

FIG. 1 is a longitudinal section of a cutting tool with a radially adjustable cutting bits spaced on the periphery along the axial direction.

FIG. 2 is a view of a cutting tool similar to FIG. 1 but having additional cutting bits and valves.

FIGS. 3 and 4 are enlarged horizontal sections through the field producing valve means of the mount, associated control circuitry and components also being schematically shown.

DETAILED DESCRIPTION OF A PREFERRED EMBODIMENT

As illustrated in FIG. 1, the cutting tool includes, as generally indicated, a cutting bit 7 normally biased outwardly in a first radial direction with respect to an axis of rotation. A fluid pressue source 12 is provided for urging the cutting bit 7 to a predetermined desired position against the force of the biasing means. The fluid pressure source 12 is a source for an incompressible electrorheological fluid. A valve means 50 is provided for effecting changes in the dynamic stiffness of the electrorheological fluid in response to an electric field. An electric field is provided for the valve means 50 to substantially block the flow of electrorheological fluid to or away from the cutting bit 7 and maintain a predetermined radial position of the cutting tool.

The cutting tool includes an elongated body 1 having a peripheral surface spaced from the axis of rotation. The elongated body 1 is joined to a flange 3 by screws in holes 2. The flange 3 may be part of the driving spindle of a machine tool. The work 4 to be machined has a bore 5 into which the elongated body 1 is axial inserted. At the peripheral surface at the forward end of the elongated body 1, a support 6 for the cutting bit is in the form of a cantilevered beam having one end fixed and the other end movable. The cutting bit 7 mounted to the movable end is normally biased toward the axis of rotation. In this case the biasing means is provided by the hole 21 and slot which form a flexure hinge 20. It is contemplated that other biasing means are within the scope of the present invention. The movable end of the support 6 contacts a driven member 10 which is part of a hydraulic cylinder 8. The hydraulic cylinder 8 and piston 9 are fixedly mounted to the elongated body 1 radially interior to the support 6 urging the cutting bit 7 outwardly.

The hydraulic cylinder 8 is operably associated with a fluid communication means 11 or conduit which is connected to a fluid pressure source 12 or a pressure liquid cylinder 12 of an air-liquid type as described in U.S. Pat. No. 4,224,846, hereinbefore mentioned, with a liquid piston 13 joined by way of a bar 14 to an air piston 15. The air piston 15 which is greater in size than the liquid cylinder 12 is positioned in a pressure medium cylinder 16 for axial motion. The pressure medium cylinder 16 is joined by way of a pressure line 17 with a source of compressed air used for controlling the motion of the air piston 15.

As illustrated in FIG. 1, radially opposed to support 6, a support 18 fixedly holds cutting bit 19 on the periphery of the elongated body 1. In this embodiment, the cutting bit 19 is used for roughing or for the first part of a smoothing operation in the bore 5. The roughing of the bore takes place on forward motion of the cutting tool while fine machining of the bore 5 is undertaken on backward motion of the elongated body 1. It is contemplated that the adjustable moving means will move the cutting bit 7 outwardly to the proper finishing cutting depth.

In FIG. 2, one additional support 6' and cutting bit 7' are placed at the periphery of the elongated body 1. The support 6' is acted upon, like the first support 6, by a piston 9', whose pressure hydraulic cylinder 8' is joined with a conduit 11'. The conduit 11' can, as shown, be a further part of the conduit 11, although it may be separate and joined with additional air and hydraulic cylinders. The first fine adjustment cutting bit 7 may be used for fine machining of the bore or cylinder bore 5 while the second or other fine-adjustment cutting bit 7' may be used for fine machining of another coaxial bore 5'.

The cutting tool may be used for preparing coaxial holes or cylinder faces with many different diameters. For example, the cutting tool may have four cutting bits with two bits being finely adjustable and two bits being fixed. It is also contemplated that the cutting tool machine not only smooth cylinder bores as noted, but also to cut grooves and machine them to the desired size. These addition embodiments are more fully described in U.S. Pat. No. 4,224,846 which is incorporated by reference into the present specification.

According to the method of operation of the system of U.S. Pat. No. 4,224,846, the liquid fluid pressure source 12 or a pressure liquid cylinder 12 is actuated by a compressed air cylinder 16. As the force increases on the cutting bit 7, the hydraulic cylinder 8 may move slightly radially inward toward the axis of rotation affecting the accuracy of the original adjustment. This back pressure may be transmitted through the fluid communicating means to the fluid pressure source 12 and the compressed air cylinder 16. In accordance with the principles of the present invention, there is provided a fluid pressure source 12 for an incompressible electrorheological fluid, and a valve means 50 operably associated with the communicating means for effecting changes in the dynamic stiffness of said electrorheological fluid in response to an electric field. The electric field producing means is provided for transmitting a sufficient electric field to said valve means 50 to substantially block the flow of electrorheological fluid to or away from the cutting bit and maintain a predetermined radial position of said cutting tool. FIG. 1 shows one valve means 50 positioned in the communication means directly adjacent the cutting bit 7. FIG. 2 shows additional valve means 50 similarly situated and additional valve means 50 situated directly adjacent the fluid pressure source 12.

U.S. Pat. No. 4,720,087 to Duclos et al describes valve means 50a and 50b (see FIGS. 3 and 4) contemplated by the present invention for controlling the flow of electrorheological fluid. As described and illustrated in the patent and incorporated by reference into the present specification, the valve means 50 as illustrated in FIGS. 3 and 4 are shown. The valve means 50a and 50b includes passageways 36a, 36b that extend in generally along the direction of fluid flow but define a tortuous and restricted path. Each passageway 36a and 36b is of narrow cross-sectional shape, has a length considerably greater than its diameter, and has a one opening communicating with the fluid communicating means and the source of fluid under pressure. The other opening can communicate with the fluid communicating means in various locations or the hydraulic cylinder 12. As shown in the cross section of the valve means 50a and 50b of FIGS. 3 and 4, annular bodies 42a, 42b, formed of electrically insulating plastic or similar material, are press fitted or otherwise fixedly secured within respective ones of the cavities or chambers 48 for holding the respective valves.

The electrorheological fluid and suitable electrode-type valve means 50, when energized, generate an electric field effecting a large increase in viscosity and substantial solidification of such fluid. As is known to those skilled in the art, electrorheological fluids customarily are comprised of solid hydrophilic particles suspended within hydrophobic liquids. One such composition consists of a mixture or slurry of precipitated silica particles suspended within silicone oil and a surfactant such as glycerol monooleate, which composition has in its unactivated state (i.e. when not exposed to an electrical field), a viscosity of approximately 30 centipoise. While the aforesaid viscosity is low in relation to that of other electrorheological fluid compositions, it is still some thirty times greater than the viscosity of the water and/or glycol fluids customarily employed in inertia-type fluid mounts.

Valve 50a includes a plurality of substantially flat electrode plates 52 extending in laterally spaced substantially parallel relationship to each other and to the central vertical axis. The opposite ends of electrode plates 52, and the outer surfaces of the outermost two of them, are bonded or otherwise fixedly secured to annular body 42a. The spaces or gaps between electrodes 52 define a plurality (illustratively nine) of vertical parallel flow paths through valve 50a. The combined cross sectional area of such flow paths preferably is significantly greater than the cross sectional area of the main part of the passageway 36a underlying valve 50a. The upper and lower edges of electrodes 52 are rounded so as to facilitate free vertical flow between the electrodes of the electrorheological fluid when such fluid is in its unactivated state. Alternate ones of electrodes 52 are electrically grounded. The remaining electrodes 52 are connected to a high voltage switching device 54 that, in response to command signals transmitted to it from a suitable controller 56, places such electrodes under a high (e.g. 6000 volts) electrical voltage producing an electrical field between adjacent one of the electrodes. The intensity of the field, which is a function of the applied voltage and of the spacing of electrodes 52 relative to each other, is such as to effect substantially instantaneous solidification or gelling of the electrorheological fluid between the electrodes. This prevents flow of the fluid within chamber 48a, which in turn prevents transmission of pressure pulses through the chamber. Upon cessation of the applied voltage, in response to a command from controller 56, the fluid promptly returns to its unactivated "flowable" state.

The other valve means 50b operates in the same manner as valve 50a, and may be of identical construction. Illustratively, however, valve 50b is comprised of two spirally shaped electrode plates 51 extending in interdigiated and laterally spaced relationship to each other so as to define therebetween an elongated path for vertical flow of the electrorheological fluid, when in its unactivated state, within chamber 48b. The outer end portions of electrodes 51 are bonded or otherwise fixedly secured to and supported by chamber 48. The cross-sectional area of the flow path through valve 50b is preferable significantly greater than the cross-sectional area of the underlying passageway 36b. The upper and lower edges of spiral electrodes 51 preferably are rounded so as to provide minimum flow resistance. One of the electrodes 51 is electrically grounded, while the other is connected to a high voltage switching device 54' under the command of a controller 56'. The foregoing components are similar to and may be the same as the switching device 54 and controller 56 shown in FIG. 3, it is contemplated that each valve 50a, 50b may be energized and de-energized with or independently of the other.

Although the voltage connections have not been described in the drawings in detail, the respective valve means are connected with appropriate electrical connections to a source of high voltage for actuating the fluid. FIG. 1 illustrates a single slip ring for actuating a respective valve while FIG. 2 illustrates a plurality of slip rings for independently controlling a respective valves 50. The slip ring and brush arrangement provide for the transmission of the appropriate electrical energy to the respective valve via electrical connections to the respective slip ring. The elongated body 1 may be conveniently grounded to provide for the dissipation of the electrical energy. Other arrangements for supplying electrical energy in the form of a relatively high voltage are contemplated. One such arrangement is disclosed in U.S. Pat. No. 4,664,236 to Stangroom where many turns of a fine wire are wound around the periphery of a rotatable body to form a primary coil. A stationary coil surrounds the primary coil and by passing a low-voltage high frequency oscillating current through the stationary coil a much larger voltage is induced in the secondary rotating coil. Further additional arrangements utilizing rectifiers are contemplated.

While specific embodiments of the invention have been shown and described, this was for purposes of illustration only, and not for purposes of limitation, the scope of the invention being in accordance with the following claims.

I claim:

1. A cutting tool of the type having an axis of rotation and a peripheral surface area spaced from the axis of rotation with at least one radially displaceable cutting bit mounted thereto comprising:

mean for biasing said cutting bit in a first radial direction with respect to said axis of rotation, means for adjustably moving said cutting bit to a predetermined desired position, said adjustable moving means including a fluid pressure source for an incompressible electrorheological fluid, means communicating with said fluid pressure source and said cutting bit for the flow of electrorheological fluid and for adjustably moving said cutting bit in a direction opposing said first radial direction in proportion to pressure being generated by said fluid pressure source, a valve means operably associated with said communicating means for effecting changes in the dynamic stiffness of said electrorheological fluid in response to an electric field, electric field producing means for transmitting a sufficient electric field to said valve means to substantially block the flow of electrorheological fluid to said cutting bit from said fluid pressure source and maintain a predetermined radial position of said cutting tool.

2. A cutting tool according to claim 1 wherein said cutting tool includes an elongated body and a driving spindle.

3. A cutting tool according to claim 2 further comprising a support for a cutting bit, wherein said support is in the form of a cantilevered beam having a fixed end and a movable end, said cutting bit being mounted to said movable end and normally biased toward said axis of rotation.

4. A cutting tool according to claim 3 wherein said biasing means comprises a flexure hinge provided as a part of said cantilevered beam.

5. A cutting tool according to claim 4 further comprising a hydraulic cylinder and piston fixedly mounted to said elongated body radially interior to said support for urging said cutting bit outwardly.

6. A cutting tool according to claim 5 wherein said hydraulic cylinder is operably associated with a fluid communication means and an air piston.

7. A cutting tool according to claim 6 comprising a plurality of cutting bits operably connected to a fluid pressure source.

* * * * *